United States Patent [19]

Khanna et al.

[11] Patent Number: 5,137,973
[45] Date of Patent: Aug. 11, 1992

[54] POLYOLEFINS CONTAINING POLYESTER NUCLEATING AGENT AND ARTICLES FORMED THEREFROM

[75] Inventors: Yash P. Khanna, Cedar Knolls, N.J.; Kevin R. Slusarz, Greenwich, Conn.; Georgette Chomyn, Denville; Tammy L. Smith, Belle Mead, both of N.J.

[73] Assignee: Allied-Signal Inc., Morristown, N.J.

[21] Appl. No.: 580,444

[22] Filed: Sep. 10, 1990

[51] Int. Cl.$^5$ ............................................. C08L 23/12
[52] U.S. Cl. ..................................... 525/177; 524/513
[58] Field of Search .......................................... 525/177

[56] References Cited

U.S. PATENT DOCUMENTS

| 3,419,638 | 12/1968 | Fuzek | 525/177 |
| 3,431,322 | 3/1969 | Caldwell | 525/177 |
| 3,928,263 | 12/1975 | Grant | 525/177 |
| 3,937,757 | 2/1976 | Seydl | 525/177 |
| 4,081,424 | 3/1978 | Gergen | 525/177 |
| 4,288,573 | 9/1981 | Karim | 525/177 |
| 4,340,528 | 7/1982 | Marsh | 524/513 |
| 4,341,690 | 7/1982 | Marsh | 524/451 |
| 4,368,295 | 1/1983 | Newton | 525/166 |
| 4,463,121 | 7/1984 | Gartland | 524/291 |
| 4,564,658 | 1/1986 | Liu | 525/177 |

Primary Examiner—Patricia A. Short
Attorney, Agent, or Firm—R. C. Stewart, II; G. H. Fuchs; D. L. Webster

[57] ABSTRACT

The invention relates to a crystalline polyolefin composition having dispersed therein a nucleating agent composed of one or more polyesters.

12 Claims, No Drawings

POLYOLEFINS CONTAINING POLYESTER NUCLEATING AGENT AND ARTICLES FORMED THEREFROM

BACKGROUND OF THE INVENTION

1. Field of the Invention

This invention relates to polyolefin based compositions containing a unique polyester nucleating agent. Another aspect of this invention relates to articles of manufacture formed totally on one part from the polyolefin based composition of this invention.

2. Prior Art

The "super" or morphological structure in which the crystalline units are arranged, affects the physical properties of polyolefins. The crystalline units are arranged in polycrystalline aggregates known as spherulites. These spherulites may be detected by microscopic examination under polarized light. They are characterized by a more or less symmetrical growth in all directions from a nucleus and are composite structures made up of crystalline and amorphous regions. The number and size of the spherulites determines the texture or graininess in the bulk of the material and influences optical as well as physical properties. Physical properties improve with increasing homogeneity and fineness of the spherulitic structure throughout the bulk of the material.

To obtain optimum physical properties in articles fabricated from polyolefins, it is desirable, therefore, to produce a highly crystalline material, crystallized with an extremely fine, dense and uniform morphological structure.

Among the physical properties affected by increased crystallinity and improved morphological structure are abrasion resistance, heat distortion temperature, inherent stability or resistance to deformation, resistance to hot water, coefficient of expansion, hardness, tensile yield strength and surface hardness.

Nucleation by foreign materials has been extensively studied, especially in the case of polypropylene. For example, H. N. Beck or H. D. Led better, *J. Appl. Polym. Sci.* 9. 2131 (1965) and H. N. Beck, *J. Appl Polym. Sci.* 11,673 (1987) checked the nucleation activity of more than two hundred substances by determining the temperature, Tcc, at which the crystallization rate on cooling is the fastest. F. L. Binsbergen, *Polymer*, 11, 253 (1970) extended these studies in testing two thousand substances for nucleating activity in polyethylene, polypropylene, poly(4-methyl-1-pentene) and poly(styrene). Other working nucleating agents for polyolefin are described on J. P. Mercier, *Polymer Engineering and Science*, 30, 270 (1990), Wijga, P. W. O. U.S. Pat. No. 3,207,735; -6; -8(1960) Wijga, P. W. O. and Binsbergen, F. L. U.S. Pat. No. 3,299,029(1961) Wales, M. U.S. Pat. No. 3,207,737; -(1961–62) Binsbergen, F. L. U.S. Pat. No. 3,326,880; 3,327,020; -1(1963) Kargin, V. A. et al, *Dokl. Akad. Nauk.* SSSR 1964, 156, 1156(transl.: Dokl. Phys. Chem. 1964, 156, 621, 644) Doring, C. and Schmidt, H. German Pat.(Federal Rep.) 1,188,279(1963) and Vonk, G. C. Kolloid Z. 1965, 206, 121.

The function of nucleating agents when cooling semi-crystalline polymers from the molten state into the solid form is to increase the number of nuclei formed in a given time interval at a predetermined temperature. The final and overall crystallinity, however, depends not only on the number of nuclei that are formed but also on the spherulitic growth rate from such nuclei. As noted above, spherulites develop with respect to a center, or nucleus, of growth. Addition of the nucleating agents thus provides a large number of sites for growth upon cooling from a melt. In order to be of practical use, such nucleating agents not only must produce a fine spherulitic structure but also must do this under conditions of rapid cooling to a temperature above the glass transition temperature of the polyolefin, i.e., they must reduce the time that is necessary under a given set of conditions for crystallization to start. This time is usually referred to as "induction time". Subsequent growth from the spherulitic center depends on the polymer chain mobility. Thus, a factor in the spherulitic growth rate is the macroscopic viscosity of the polymer and its temperature dependence. All segmental motion is "frozen in" at the glass transition temperature (Tg) and no additional crystallization occurs even when nuclei are present This Tg is about $-20°$ C. in polypropylene.

Polyesters and polyolefinic materials are known and have experienced acceptance in forming shaped objects, as for example films, sheets, fibers and the like. See for example U.S. Pat. Nos. 4,454,196; 4,410,473; 4,359,557; 4,587,154; 4,567,092; 4,562,869; and 4,559,862.

Mixture of polyolefins and polyesters and the use of same to fabricate articles such as film and fibers are known See for example U.S. Pat. Nos. 3,639,505; 4,609,710; 3,900,549; 3,359,344; and 7,552,603.

SUMMARY OF THE INVENTION

In accordance with this invention, there is provided a polyolefin based composition containing a unique nucleating agent which provides for a relatively homogeneous and fine spherulitic or crystal structure dispersed in said composition. More particularly, the composition of this invention comprises:

one or more polyolefins; and an effective amount of one or more nucleating polyesters.

Yet another aspect of this invention relates to a novel process for enhancing the rate of crystallization of a polyolefin from the melt, which comprises adding to said polyamide a crystallization enhancing effective amount of the nucleating agent of this invention.

Several advantages flow from this invention. For example, by speeding up the rate of crystallization, processing times are decreased. Moreover, the polyolefins formed in accordance with this invention are characterized by relatively homogeneous and fine spherulitic structures which have improved optical clarity and as a result have enhanced utility in applications where such clarity is required. Furthermore, the polyolefin compositions of this invention exhibit improved physical properties.

DESCRIPTION OF THE PREFERRED EMBODIMENTS

As an essential ingredient, the composition of this invention includes one or more polyolefins. Illustrative of polyolefins for use in the practice of this invention are those formed by the polymerization of olefins of the formula:

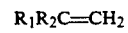

wherein:

$R_1$ and $R_2$ are the same or different and are hydrogen or substituted or unsubstituted alkylphenyl, cycloalkyl, phenylalkyl, phenyl or alkyl. Useful polyolefins include polystyrene, polyethylene, polypropylene, poly(1-octadecene), polyisobutylene. poly(1-pentene), poly(2-methylstyrene), poly(4-methylstyrene), poly(1-hexene), poly(5-methyl-1-hexene), poly(4-methylpentene), poly(1-butene), poly(3-methyl-1-butene), poly(3-phenyl-1-propene), polybutylene, poly(methyl pentene-1), poly(1-hexene), poly(5-methyl-1-hexene), poly(1-octadecene), poly(vinyl cyclopentane), poly(vinylcyclohexane), poly(a-vinylnaphthalene), and the like.

Preferred for use in the practice of this invention are polyolefins of the above referenced formula in which R is hydrogen or alkyl having from 1 to about 12 carbon atoms such as polyethylene, polypropylene, polyisobutylene, poly(4-methyl-1-pentene), poly(1-butene), poly(1-pentene), poly(3-methyl-1-butene), poly(1hexene), poly(5-methyl-1-hexene), poly(1-octene), and the like.

In the particularly preferred embodiments of this invention, the polyolefins of choice are those in which $R_1$ is hydrogen and $R_2$ is hydrogen or alkyl having from 1 to about 8 carbon atoms such as polyethylene, polypropylene, poly(1-hexene), poly(4-methyl-1-pentene), and poly(1-hexene), poly(4-methyl-1-pentene), and poly(1-octene). Amongst these particularly preferred embodiments, most preferred are those embodiments in which $R_1$ is hydrogen and $R_2$ is hydrogen or alkyl having from 1 to about 6 carbon atoms such as polyethylene, polystyrene, polypropylene, poly(4-methyl-1-pentene), and polyisobutylene, with polypropylene being the polyolefin of choice.

The amount of polyolefin included in the composition of the invention may vary widely and is usually from about 99.99 to about 90.00 percent by weight based on the total weight of the composition. In the preferred embodiments of this invention, the amount of polyolefin is from about 99.99 to about 95.00 weight percent based on the total weight of the composition; and in the particularly preferred embodiments of the invention the amount of polyolefin in the composition is from about 99.90 to about 99.0 weight percent based on the total weight of the composition. Amongst the particularly preferred embodiments, most preferred are those embodiments in which the amount of polyolefin is from about 99.90 to about 99.5 percent by weight based on the total weight of the composition.

Polyolefins for use in the practice of this invention may be obtained from commercial sources or prepared in accordance with known preparatory techniques. For example, useful polyolefins, such as polypropylene, polystyrene, polyethylene and poly(4-methyl-1-pentene) can be obtained commercially as for example ICI Ltd, and Dupont Co. Such polyolefins can also be prepared by a low temperature process using an organic metallic catalyst, as for example those described in Belg. Pat. 533,362 and U.S. Pat. No. 2,691,647 which are hereby incorporated by reference.

The molecular weight of the polyolefin may vary widely. For example, the polyolefin may be a wax having a relatively low molecular weight i.e., 500 to 1,000 or more. The polyolefin may also be melt spinnable and of fiber forming molecular weight. Such polyolefins for use in the practice of this invention are well known. Usually, the polyolefin is of fiber forming molecular weight having a molecular weight of at least about 5,000. In the preferred embodiments of the invention the molecular weight of the polyolefins is from about 8,000 to about 1,000,000 and in the particularly preferred embodiments is from about 25,000 to about 750,000. Amongst the particularly preferred embodiments most preferred are those in which the molecular weight of the polyolefins is from about 50,000 to about 500,000.

As a second essential component, the composition of this invention will include an "effective amount" of an "effective nucleating agent". Effective nucleating agents employed in the practice of this invention comprise one or more polyesters of effective molecular weight.

Polyesters useful in the practice of this invention may vary widely. The type of polyester is not critical and the particular polyester chosen for use in any particular situation will depend essentially on the crystallization properties and features, i.e., desired in the final composition element. Thus, a multiplicity of linear thermoplastic polyesters having wide variations in physical properties are suitable for use in this invention.

The particular polyester chosen for use can be a homo-polyester or a co-polyester, or mixtures thereof as desired. Polyesters are normally prepared by the condensation of an organic dicarboxylic acid and an organic diol, and, therefore illustrative examples of useful polyesters will be described here in below in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids. Illustrative of useful aromatic diols, are those having from about 6 to 12 carbon atoms. Such aromatic diols include bis(p-hydroxyphenyl) ether; bis-(p-hydroxphenyl) thioether; (bis p-hydroxyphenyl)-sulphone; bis(p-hydroxyphenyl)-methane; 1,2-(bis-(p-hydroxyphenyl)-ethane; 1-pheny-(p-hydroxphenyl)-methane; diphenyl-bis(p-hydroxyphenyl)-methane; 2,2-bis(4'-hydroxy-3'-dimethylphenyl propane; 1,1-bis(p-hydroxyphenyl)-butane: 2,2-(bis(p-hydroxyphenyl)-butane: 1,1-(bis(p-hydroxyphenyl)-cyclopentane; 2,2-(bis(p-hydroxyphenyl)-propane (bisphenol A); 1,1-(bis(p-hydroxyphenyl)-cyclohexane (bisphenol C); p-xylene glycol; 2,5-dichloro-p-xylylene glycol; p-xylene-diol; and the like.

Suitable cycloaliphatic diols include those having from about 5 to about 8 carbon atoms. Exemplary of such useful cycloaliphatic diols are 1,4-dihydroxy cyclohexane; 1,4-dihydroxy methylcyclohexane; 1,3-dihydroxycyclopentane; 1,5-dihydroxycycloheptane; 1,5-dihydroxycyclooctane; 1,4-cyclohexane dimethanol; and the like. Polyesters which are derived from aliphatic diols are preferred for use in this invention. Useful and preferred aliphatic and cycloaliphatic diols includes those having from about 2 to about 12 carbon atoms, with those having from about 2 to about 6 carbon atoms being particularly preferred. Illustrative of such preferred diol precursors are propylene glycols; ethylene glycol, pentane diols, hexane diols, butane diols and geometrical isomers thereof. Propylene glycol, ethylene glycol, 1,4-cyclohexane dimethanol, and 1,4-butanediol are particularly preferred as diol precursors of polyesters for use in the conduct of this invention.

Suitable dicarboxylic acids for use as precursors in the preparation of useful polyesters are linear and branched chain saturated aliphatic dicarboxylic acids, aromatic dicarboxylic acids and cycloaliphatic dicarboxylic acids. Illustrative of aliphatic dicarboxylic acids which can be used in this invention are those having from about 2 to about 50 carbon atoms, as for example, oxalic acid, malonic acids, dimethyl-malonic acid, succinic acid, octadecylsuccinic acid, pimelic acid, adipic acid, trimethyladipic acid, sebacic acid, suberic acid, azelaic acid and dimeric acids (dimerization products of unsaturated aliphatic carboxylic acids such as oleic acid) and alkylated malonic and succinic acids, such as octadecylsuccinic acid, and the like.

Illustrative of suitable cycloaliphatic dicarboxylic acids are those having from about 6 to about 15 carbon atoms. Such useful cycloaliphatic dicarboxylic acids include 1,3-cyclobutanedicarboxylic acid, 1,2-cyclopentanedicarboxylic acid, 1,3- and 1,4-cyclohexanedicarboxylic acid, 1,3- and 1,4-dicarboxymethylcyclohexane and 4,4-dicyclohexdicarboxylic acid, and the like.

Polyester compounds prepared from the condensation of a diol and an aromatic dicarboxylic acid are preferred for use in this invention. Illustrative of such useful aromatic carboxylic acids are terephthalic acid, isophthalic acid and a o-phthalic acid, 1,3-, 1,4-, 2,6 or 2,7-naphthalenedicarboxylic acid, 4,4'-diphenyldicarboxylic acid, 4,4'-diphenylsulphone-dicarboxylic acid, 1,1,3-trimethyl-5-carboxy-3-(p-carboxyphenyl)-idane, diphenyl ether 4,4'-dicarboxylic acid bis-p(carboxyphenyl)methane and the like. Of the aforementioned aromatic dicarboxylic acids, those based on a benzene ring such as terephthalic acid, isophthalic acid, and ortho-phthalic acid are preferred for use and amongst these preferred acid precursors, terephthalic acid is particularly preferred.

In the most preferred embodiments of this invention poly(ethylene terephthalate), poly(butylene terephthalate), and poly(1,4-cyclohexane dimethylene terephthalate), are the polyesters of choice. Among these polyesters of choice, poly(butylene terephthalate) is most preferred.

Surprisingly, it has been discovered that the molecular weight of the polyester nucleating agent has an effect on the nucleating ability of the polyester. In general, the lower the molecular weight of the polyester the greater the nucleating effect of the polyester and; conversely, the greater the molecular weight of the polyester, the lower the nucleating effect of the polyester. In general, the polyester must be of a "nucleating effective molecular weight". As used herein "a nucleating effective molecular weight" is a molecular weight at which the polyester exhibits some nucleating effect on the polyolefin as exemplified by an increase in the crystallization temperature (Tcc) of the polyolefin as evidence by Differential Scanning Calorimetry (DSC).

In general, the intrinsic viscosity (indicative of the molecular weight) of the polyester is equal to or less than about 1.50 as measured by the ASTM D2857 procedure at 25° C. in phenol/tetrachloroethane (60/40% by weight). In the preferred embodiments of the invention the intrinsic viscosity of the polyester is from about 0.01 to about 1.50 and in the more preferred embodiments the intrinsic viscosity is from about 0.03 to about 1.00. In the most preferred embodiments of the invention, the intrinsic viscosity is from about 0.05 to about 0.20.

The amount of nucleating agent added to the polyolefin is an "effective amount". As used herein, an "effective amount" is an amount which is sufficient to improve the homogeneity and/or fineness of spherulitic structures in the polyolefin to any extent. Such amounts will normally correspond to amounts of conventional nucleating agents. In the preferred embodiments of the invention, the amount of nucleating agent employed is in the range of from about 0.15 to about 1 weight percent based on the total weight of polyolefin and agent, and in the particularly preferred embodiments of the invention is from about 0.2 to about 0.6 weight percent on the aforementioned basis. Amongst these particularly preferred embodiments, most preferred are those embodiments where the amount of nucleation agent employed is from about 0.25 to about 0.4 weight percent based on the total weight of agent and polyolefin.

In addition to the above-described essential components, the molding composition of this invention can include various optional components which are additives commonly employed with polyester and polyolefin resins. Such optional components include fillers, plasticizers, impact modifiers, chain extenders, colorants, mold release agents, antioxidants, ultra violet light stabilizers, lubricants, antistatic agents, fire retardants, and the like. These optional components are well known to those of skill in the art, accordingly, only the preferred optional components will be described herein in detail.

The molding composition of this invention preferably includes a fibrous or particulate filler, which functions to increase the modulus and stiffness of the composition, and provides a more economical composition. Any conventional fibrous or particulate filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and materials thereof. Examples of such useful fillers include alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, and the like. Such fillers are well known materials and are readily available. The foregoing recited fillers are illustrative only and are not meant to limit the scope of the fillers that can be employed in this invention. In the preferred embodiments of this invention, fibrous materials such as fiber glass, carbon fibers, boron fibers and polymer fibers are the fillers of choice, and the glass fibers is the filler of choice in the particularly preferred embodiments of this invention.

The quantity of filler employed is not critical and can be varied widely as desired In the preferred embodiments of this invention, the quantity of filler is up to about 150 weight percent based on the total weight of the polymer component, and in the particularly preferred embodiment is in the range of from about 30 to about 90 weight percent on the same basis.

While not essential, it may be desirable to include an optional plasticizer in the composition of this invention. The plasticizer allows crystallization of the amorphous areas of the composition to continue at lower temperatures than if a plasticizer is not used. This is particularly important in low temperature molding. The plasticizers which can be used with the composition of the present invention are of the type known in the art as useful in linear polyolefin molding compositions. Such useful plasticizer compositions are well known in the art and accordingly will not be described herein in detail.

The composition of this invention can be further modified by the addition of one or more pigments. Illustrative of useful pigments are iron oxide, cadmium red, rhodamine, chrome yellow, chrom green, and phthalocyanine blue.

The composition of this invention can be prepared by blending or mixing the essential ingredients, and other optional components, as uniformly as possible employing any conventional blending means. Appropriate blending means, such as melt extrusion, batch melting and the like, are well known in the art and will not be described here in greater detail. In one useful procedure, the blending procedure can be carried out at elevated temperatures above the melting point of the polymer and the nucleating agent added either alone or as individual components of the agent separately or as a combination of the components in a suitable form as for example, granules, pellets and preferably powders are added to the melt with vigorous stirring. Alternatively, all or a portion of the various components of the nucleating agent can be masterbatched or preblended with the polyolefin in the melt and this premixed or masterbatch added to the polyolefin in the melt in amounts sufficient to provide the desired amount of nucleating agent in the polyolefin product. Stirring is continued until a homogeneous composition is formed. The nucleating agent can also be added to the melt coated on the surface of small particle inert powders which have a high surface to volume ratios. The use of such inert powders, as for example, fused silica, fused alumina, carbon black and aerogels, and hydrogels of silica or alumina, helps to reduce the amount of nucleating agent required to provide optimum results. Accordingly, such powders will be employed in the conduct of the preferred embodiments of this invention. Blending temperatures and blending pressures, and the order of addition of the various components are not critical and may be varied as desired provided that a substantially homogeneous composition results. The blending procedure can be carried out at elevated temperatures, in which case the polymer component is melted and the solid nucleating agent is admixed therewith by vigorously stirring the melt. Similarly, the various solid components can be granulated, and the granulated components mixed dry in a suitable blender, or for example, a Banbury mixer, as uniformly as possible, then melted in an extruder and extruded with cooling.

Alternatively, the composition of this invention can be formulated by dissolving the components in an appropriate inert solvent, after which the solvent is removed by evaporation, or other conventional solvent removing means are employed to provide the composition. The solvent is not critical, the only requirement being that it is inert to the components of the composition, and it is capable of solubilizing the various components, or at least forming dispersions thereof.

The compositions according to the invention can be partially crystalline to amorphous, depending on which individual constituents are employed. They are thermoplastic materials from which molded articles of manufacture having valuable properties can be produced by the conventional shaping processes, such as melt spinning, casting, injection molding and extruding. Examples of such moldings are components for technical equipment, apparatus casting, household equipment, sports equipment, components for the electrical and electronics industries and electrical insulations, car components, circuits, fibers, and semi-finished products which can be shaped by machining. The use of the materials for coating articles by means of immersion or powder coating processes is also possible, as is their use as hot-melt adhesives. The molding compositions according to the invention are outstandingly suitable for specific applications of all types since their spectrum of properties can be modified in the desired direction in manifold ways.

The compositions according to the invention are outstandingly suitable for the production of sheets and panels having valuable properties. The sheets and panels according to the inventions are suitable as coating materials for otherm materials comprising, for example, wood, glass, ceramic, metal or other plastics, and outstanding strengths can be achieved using conventional adhesion promoters, for example, based on vinyl resins. The sheets and panels can also be laminated with other plastic films and this is preferably effected by joint extrusion, the sheets being bonded in the molten state. The surfaces of the sheets and panels, including those in the embossed form, can be improved or finished by coventional methods, for example by lacquering or by the application of protective films. The compositions of this invention are especially useful for fabrication of extruded films, as for example films for use in food packaging.

EXAMPLES

I. General Procedure

A. Melt-Mixing Procedure

About 25 mg (0.5%) of powdered poly(butylene terephthalate) (PBT) was added to 5 gm of the powdered isotactic polypropylene and tumble mixed on a roll mill. This mixture was fed into the reservoir of an Instron Capillary rheometer, equilibrated at 180° C. for 5 minutes, and then extruded into strands of about 3 mm diameter. The strands were chopped into pieces (~0.25" long) and subsequently re-extruded under the same conditions in order to provide a better dispersion of the additive in the polymer. Polypropylene alone was also treated similarly to obtain a control sample. The loading of the additives was 0.5% unless otherwise noted.

B. Solution-Mixing Procedure

About 5 mg (0.5%) of the powdered additive was added to 1 gm of the powdered isotactic polypropylene and refluxed with 10 gm of dichlorobenzene at 180° C. for about 16 hours. The solution was then quick-cooled under tap water and the dispersion of PBT/polypropylene recovered by filtration. The samples were dried under high vacuum at about 130° C. Polypropylene alone was also treated similarly to obtain a control sample

B. Differential Scanning Calorimetry (DSC)

An automated DuPont 9900 DSC operating in an argon atmosphere was used for analysis. About 10($\pm$1) mg sample was crimped in an aluminum cup heated from 0° C. to 200° C. at a rate of 20° C./min., held at 200° C. for 5 min., and then subsequently cooled at a rate of 10° C./min. The data is represented as a crystallization temperature upon cooling ($T_{cc}$ °C.).

Selected samples were also analyzed by isothermal DSC. In these experiments, the samples were cooled to 135° C. and isothermally crystallized at 135° C./4 hours following the 200° C./5 min. treatment.

C. Optical Microscopy

The samples crystallized in the DSC isothermally at 135° C. for 4 hours, were cross-sectioned and the photomicrographs prepared in transmitted polarized light.

D. Viscosity Measurement

Intrinsic viscosity of the PBT samples was measured in phenol/tetrachloroethane (60/40% by weight) at 25° C. according to the ASTM D2857 procedure.

II Description of Examples

A. Example I

Using the melt-mixing procedure, poly(butylene terephthalate) (PBT) was dispersed in polypropylene and the following results obtained:

| PBT Intrinsic Visc. [η] | Wt. % | Cryst. Temp. of Polypropylene Tcc, °C. |
|---|---|---|
| 1.03 | None | 110 |
| | 0.25 | 112 |
| | | 114 |
| | 0.50 | 115 |
| | | 114 |
| | 1 | 114 |
| | 2 | 114 |
| | 5 | 116 |
| | 10 | 114 |
| <1.03* | 0.4* | 119 |

*Degraded by compression molding the powdered PBT in the presence of 1% water at about 250° C.

The results in example I demonstrate that the PBT after degradation becomes more effective in enhancing the crystallization temperature (thus rate) of polypropylene.

B. Example II

An inverse relationship between the effectiveness and molecular weight (i.e. intrinsic viscosity) of PBT at a concentration of about 0.5% in polypropylene is demonstrated by the following data:

| Cryst. Temp. of Polypropylene, $T_{cc}$, °C. | |
|---|---|
| Intrinsic Visc. of PBT [η] | Tcc, °C. |
| 1.03 | 114 |
| 1.01(1) | 116 |
| γ(2) | 119 |
| 0.08(3) | 121 |

(1)Degraded by refluxing the powdered PBT in dichlorobenzene at 180° C. for 16 hours.
(2)Degraded by compression molding the powdered PBT in the presence of 1% water at about 250° C.[η] < .03.
(3)Degraded by heating the powdered PBT in the presence of 1% water at about 250° C. in the sealed stainless steel bomb.

Example III

As shown by the data in Example III, varying the amount of PBT (0.25–10%) does not affect the crystallization behavior of polypropylene.

| PBT (wt. %)* | Cryst. Temp. of Polypropylene, Tcc, °C. |
|---|---|
| None | 110 |
| 0.25 | 120 |
| 0.50 | 121 |
| 1.00 | 120 |
| 5.00 | 121 |
| 10.00 | 120 |

*Degraded by heating the powdered PBT in the presence of 1% water at about 250° C. in a sealed stainless steel bomb.

Example IV

The role of PBT in enhancing the crystallization rate of polypropylene is further reinforced when the two components are mixed by the solution method.

| PBT (wt. %)* | Cryst. Temp. of Polypropylene, Tcc, °C. |
|---|---|
| None | 120 |
| 0.1 | 125 |
| 0.5 | 127 |
| 2.0 | 128 |

What is claimed is:

1. A composition comprising:
   (a) polypropylene; and
   (b) a nucleating effective amount of poly(butylene terephthalate) having an intrinsic viscosity of less than about 0.20.

2. A composition according to claim 1 wherein said poly(butylene terephthalate) has a intrinsic viscosity of about 0.05 to about 0.20.

3. A composition according to claim 2 wherein the amount of said poly(butylene terephthalate) is from about 0.2 to about 1.0% by wgt. of the total weight of the composition.

4. A composition according to claim 3 wherein said amount is about 0.5% by wgt.

5. A composition according to claim 1 wherein the amount of said poly(butylene terephthalate) is at least about 0.01 weight percent based on the total weight of the composition.

6. A composition according to claim 5 wherein the amount of said poly(butylene terephthalate) is from about 0.1 to about 25 weight percent.

7. A composition according to claim 6 wherein the amount of said poly(butylene terephthalate) is from about 1 to about 15 weight percent.

8. A composition according to claim 7 wherein the amount of poly(butylene terephthalate) is from about 2.5 to about 10 weight percent.

9. A composition according to claim 8 wherein the amount of poly(butyelene terephthalate) is from about 3 to about 8.5 weight percent.

10. A composition according to claim 6 wherein said intrinsic viscosity is from about 0.01 to about 0.20.

11. A composition according to claim 7 wherein said intrinsic viscosity is from about 0.03 to about 0.20.

12. An article of manufacturing fabricated totally or in part from the composition of claim 1, 2, 3 or 4.

* * * * *